Patented Sept. 1, 1942

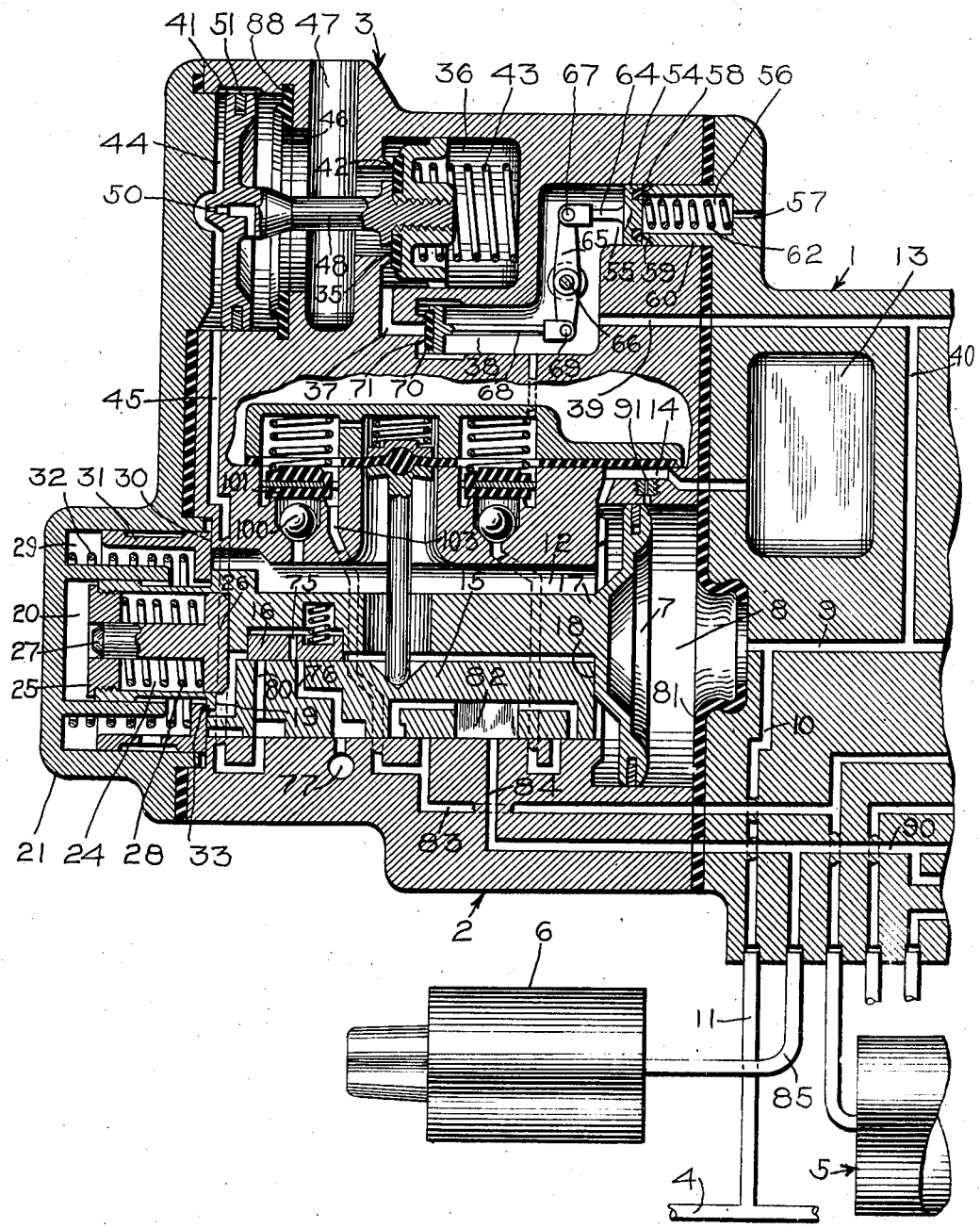

2,294,604

UNITED STATES PATENT OFFICE 2,294,604

FLUID PRESSURE BRAKE

Joseph C. McCune, Edgewood, Pa., assignor to The Westinghouse Air Brake Company, Wilmerding, Pa., a corporation of Pennsylvania Application October 24, 1940, Serial No. 362,559

9 Claims. (Cl. 303—42)

This invention relates to fluid pressure brake equipment and more particularly to the type adapted to operate upon a reduction in brake pipe pressure to effect an application of the brakes.

In Patent No. 2,031,213, issued to Clyde C. Farmer, on February 18, 1936, a brake controlling valve device is disclosed which comprises a service portion adapted to operate upon a service reduction of brake pipe pressure to effect a service application of the brakes, and which also comprises an emergency portion adapted to operate along with the service portion upon an emergency reduction in brake pipe pressure to effect an emergency application of the brakes.

The emergency portion of the brake controlling valve device includes a piston subject to the opposing pressures of the brake pipe and a quick action chamber, and further includes a main slide valve and an auxiliary slide valve mounted on said main slide valve, which slide valves are adapted to be operated by said piston.

Upon a reduction in brake pipe pressure at a service rate, the piston is adapted to move the auxiliary slide valve relative to the main slide valve to a service position in which a communication is established through which the pressure of fluid in the quick action chamber is adapted to be reduced as fast as brake pipe pressure reduces, so as to thereby prevent movement of said piston and both the auxiliary and main slide valves to emergency position. This communication is so restricted that when brake pipe pressure is reduced at an emergency rate a sufficient pressure differential is obtained on the piston to cause the piston and thereby the auxiliary and main slide valves to move past service position to emergency position.

The piston and auxiliary slide valve are so designed as to move to service position upon a small differential of pressure, such as .4 of a pound. In this position a spring comes into action which requires that the differential on the piston be further increased a certain amount, such as .5 of a pound, before the piston can move the auxiliary and main slide valves to emergency position. In other words, a differential such as .9 of a pound is required on an emergency reduction to move the auxiliary and main slide valves to emergency position.

Under all normal conditions of operation, the emergency portion of the brake equipment will operate in the manner and on substantially the pressure differentials as above described. If, however, the resistance to movement of the piston from its release position should increase, due for instance to the accumulation of foreign matter around the piston or for any other reason, to such a degree as to require a pressure differential of more than .4 of a pound to start the piston moving, it is possible for the piston and associated slide valves to move through service position to emergency position and thereby initiate an undesired emergency application of the brakes on the train.

It is undesirable to have an emergency application of the brakes occur upon effecting a service reduction in brake pipe pressure since such generally results in the stopping of the train which interferes with the operating schedule thereof. Further, such an emergency application of the brakes is, under some conditions, liable to cause damage to cars in the train or to the lading carried thereby. The principal object of the invention is to provide improved means for preventing an unwanted emergency application of the brakes from occurring upon a reduction in brake pipe pressure at a service rate.

Other objects and advantages will be apparent from the following, more detailed description of the invention.

In the accompanying drawing, the single figure is a diagrammatic view of a portion of a fluid pressure brake equipment embodying the invention.

Except as hereinafter pointed out the emergency portion of the fluid pressure brake equipment shown in the drawing may be similar to the corresponding emergency portion of the brake equipment disclosed in the aforementioned patent, and, for the sake of clarity, only those parts are shown in detail which are deemed essential to a comprehensive understanding of the invention.

The portion of the fluid pressure brake equipment which has been illustrated here comprises a pipe bracket 1 to which there is secured an emergency valve device 2 and a quick action brake pipe vent valve device 3. Connected to the pipe bracket is a brake pipe 4, an emergency reservoir 5 and a brake cylinder 6.

The emergency valve device 2 comprises an emergency piston 7, having at one side a chamber 8 connected with the brake pipe 4 through passages 9 and 10 and a brake pipe branch pipe 11, and having at the opposite side a valve chamber 12 which is connected to a quick action chamber or volume reservoir 13 through a passage 14.

A main slide valve 15 and an auxiliary slide valve 16 are disposed in the valve chamber 12 for operation by the piston 7 through the medium of a stem 17 carried by said piston. The stem 17 has a cavity in which the auxiliary slide valve 16 is disposed, and is provided with spaced shoulders 18 and 19 adapted to engage the main slide valve 15 for moving same. The other end of the piston stem 17 is slidably mounted in a suitable bore 20 provided in a cover 21 which is adapted to close the left hand end of the valve chamber 12.

A bore 24 is provided in the end of the piston stem 17, the outer end of this bore being closed by a plug 25, while the inner end of the bore extends beyond the shoulder 19 in a direction towards the piston 7. A plunger 26 is slidably mounted in this bore and has a stem 27 mounted in a suitable bore in the plug 25. A spring 28 is interposed between the plug 25 and the plunger 26 and acts to urge the plunger into engagement with the inner end wall of the bore 24, in which position the right hand face of said plunger is disposed between shoulder 19 and adjacent end of the main slide valve 15.

The cover 21 is provided with an annular chamber 29 surrounding the portion of the cover in which the bore 20 is formed. The chamber 29 is of slightly greater diameter than that of the valve chamber 12 so as to provide a shoulder 30 on the emergency valve casing. A stop 31 is slidably mounted in chamber 29 and is urged into engagement with the shoulder 30 by means of a spring 32 disposed in said chamber. The stop 31 is provided with a central opening through which the piston stem 17 extends into the bore 20, and the piston stem is provided with an annular shoulder 33 adapted to engage said stop for defining the normal position of the main slide valve, these elements being shown in their normal position in the drawing.

The quick action brake pipe vent valve device 3 comprises a casing containing a brake pipe vent valve 35 provided in a chamber 36 which is connected to the brake pipe 4 by way of a passage 37, a valve chamber 38, a passage 39, a passage 40, passages 9 and 10 and pipe 11. A piston 41 is connected to the vent valve 35 by a stem 48 and is operative to move said vent valve out of engagement with a seat rib 42. A spring 43 is provided in chamber 36 and acts on the vent valve 35 for urging same into sealing engagement with the seat rib 42.

The piston 41 is exposed at one side to a chamber 44 which is connected by a passage 45 to the seat of the slide valve 15, and at the opposite side is exposed to a chamber 46 which is open to the atmosphere through a passage 47. Piston 41 is provided with a restricted blow down timing port 50 connecting chambers 44 and 46. A leakage groove 51 is provided in the casing to connect chambers 44 and 46 when the piston is in its normal position as shown in the drawing.

According to the invention, the passage through which fluid under pressure is adapted to flow from the brake pipe to the brake pipe vent valve chamber 36 is controlled by a valve mechanism which maintains the passage closed so long as brake pipe pressure is not reduced below that required to effect a full service application of the brakes.

The valve mechanism comprises a movable abutment, preferably in the form of a piston 54, having at one side a chamber 55 which is in constant open communication with the chamber 38, which chamber as hereinbefore described is connected to the brake pipe 1 by way of passages 39, 40, 9, 10 and brake pipe branch pipe 11. At the other side of the piston there is a chamber 56 which is in constant open communication with the atmosphere by way of a passage 57. A valve 58 carried by said piston is adapted to engage a seat rib 59, formed on an extension 60 of the pipe bracket 1, for preventing leakage of fluid under pressure from chamber 55 to chamber 56 for the position of the parts shown. A spring 62 is disposed to chamber 56, which spring, at all times, tends to urge said valve in the direction away from its seat.

A lever 65 is disposed in chamber 38 and is fulcrumed intermediate its ends on a pin 66. One end of this lever is pivotally connected, by means of a pin 67, to a stem 64 with which the piston 54 is provided. The other end of the lever 65 is pivotally connected, by means of a pin 69, to one end of a rod 68. The other end of this rod is secured to a valve 70 which is adapted to engage an annular seat rib 71 formed on the casing, to close communication between the chambers 38 and 36 by way of passage 37.

*Operation*

In order to initially charge the equipment, fluid under pressure supplied to brake pipe 4 in the usual well known manner flows therefrom through brake pipe branch pipe 11 and passages 10 and 9 to emergency piston chamber 8 and to the service portion (not shown) of the equipment. The service portion of the equipment, as fully described in the above mentioned patent and well known by those skilled in the fluid pressure brake art, is adapted to operate upon an increase in pressure in brake pipe 4 to supply fluid under pressure to the emergency reservoir 5 for charging same, and to establish communication through which fluid under pressure is released from the brake cylinder 6 to release the brakes, and is adapted to operate upon either a service or an emergency reduction in brake pipe pressure to supply fluid under pressure through a passage 90 to the brake cylinder 6 for applying the brakes.

With the parts of the emergency valve device 2 in their normal release position, as shown in the drawing, fluid under pressure supplied to piston chamber 8, upon an increase of brake pipe pressure, flows through a restricted feed port 91 to passage 14 and from thence to the emergency valve chamber 12 and quick action chamber 13, thereby charging said chambers with fluid at brake pipe pressure.

With the emergency piston 7 and attached slide valves 15 and 16 in their normal position, passage 45 which leads to the brake pipe vent valve piston chamber 44 is lapped by the auxiliary slide valve 16, so that the vent valve piston chamber 44 is maintained at atmospheric pressure, because of port 50. With the chamber 44 at atmospheric pressure the spring 43 acts to seat the vent valve 35 on the seat rib 42.

Since the equipment is being initially charged with fluid under pressure spring 62 acts through the medium of piston 54, stem 64, lever 65 and rod 68 to maintain valve 70 unseated, and fluid under pressure in passage 9 flows through passages 40 and 39, chamber 38, past unseated valve 70 and passage 37 to vent valve chamber 36. With the vent valve 35 seated, the chambers 36 and 38 are charged with fluid under pressure through the circuit just traced and when the pressure of fluid in chamber 38 acting on the piston 54 has been increased to a value sufficient to overcome the opposing force of the spring 62, the piston 54 and attached piston stem 64 are caused to move in a direction towards the right hand, and thus, through the medium of pin 67, turns the lever 65 in a clockwise direction about the pin 66. This movement of lever 65 causes the rod 68 to move in a direction toward the left hand, thus moving the valve 70 into sealing engagement with the seat rib 71, to cut off communication between chambers 38 and 36.

When a service reduction in brake pipe pressure is effected to produce an application of the brakes, a corresponding reduction in pressure occurs in emergency piston chamber 8. Fluid under pressure then tends to flow back from valve chamber 12 and quick action chamber 13 through the feed port 91 to the piston chamber 8, but this feed port is so restricted that the required pressure differential of .4 of a pound quickly develops on the piston 7.

When this pressure differential is attained the piston 7 is supposed to move toward the right hand and move the auxiliary slide valve 16 relative to the main slide valve 15 to service position, in which a vent port 75 in the auxiliary slide valve registers with a port 76 in the main slide valve 15, which port 76 is in registration with an atmospheric passage 77. Through the communication thus established, fluid under pressure is discharged from the valve chamber 12 and quick action chamber 13 at a rate corresponding to the service rate of reduction in brake pipe pressure so as to prevent the quick action chamber pressure from effecting an increase in the pressure differential on the piston 7. After the service port 75 is moved into registry with port 76 the plunger 26 carried by the emergency piston stem 17 engages the rear end of the main slide valve 15, so that further movement of the piston is opposed by the pressure of spring 28 acting on said plunger.

The spring 28 is of such a value that for the pressure differential stated it will prevent movement of the emergency piston 7 and auxiliary and main slide valves past service position upon a service reduction in brake pipe pressure. By means of the service venting of fluid under pressure from valve chamber 12 and stabilizing action of spring 28 on piston 7, movement of the several parts of the emergency valve device past service position in effecting a service application of the brakes is prevented under all normal conditions of operation.

It should here be noted that the piston 54 for maintaining the valve 70 seated and the spring 62 for actuating the piston to unseat the valve are so proportioned that the piston will maintain the valve seated so long as the reduction of brake pipe pressure does not exceed a full service reduction. When, as in effecting an emergency application of the brakes, the reduction in brake pipe pressure exceeds a full service reduction spring 62 acts to effect the unseating of valve 70.

In order to effect a release of the brakes after a service application, the brake pipe pressure is increased in the usual manner. Fluid under pressure then flows from brake pipe 4 to the service portion (not shown) of the device which operates to release fluid under pressure from the brake cylinder 6 in the usual manner. Fluid under pressure is also supplied from the brake pipe to the piston chamber 8 causing emergency piston 7 and thereby the associated auxiliary slide valve to move relative to the main slide valve to release position in which the valve chamber 12 and quick action chamber 13 are recharged with fluid under pressure by way of piston chamber 8 and restricted passage 91, and in which the port 75 is out of registration with the port 76 in the main slide valve.

When the brake pipe pressure is reduced at an emergency rate the service portion of the equipment moves to application position to supply fluid under pressure from the auxiliary reservoir to the brake cylinder in the usual manner, and the emergency piston and associated auxiliary and main slide valves will move to emergency position, the piston 7 in moving through its service position to emergency position overcoming the opposition offered by the spring 28 and moves the auxiliary slide valve relative to the main slide valve a distance sufficient to first lap port 76 in the main slide valve and then open a port 80 in the main slide valve to the valve chamber 12. The port 80 is in registration with the passage 45 so that fluid under pressure now flows from valve chamber 12 and connected quick action chamber 13 to the piston chamber 44 of the quick action vent valve device, causing the piston to operate to unseat the vent valve 35. The continued reduction in brake pipe pressure will cause the piston 7 to operate to move the main slide valve 15 to emergency position in which said valve will uncover the passage 45 to the valve chamber 12 so that the pressure of fluid from the chamber will maintain the vent valve piston and thereby the vent valve in brake pipe venting position.

When brake pipe pressure is reduced to effect an application of the brakes the pressure in connected chambers 38 and 55 is also reduced through passages 39, 40, 9, 10 and pipe 11. When, in effecting an emergency application of the brakes, the pressure of fluid in chamber 55 and acting on one side of piston 54 is reduced below that required to effect a full service application of the brake, the spring 62 acts through the medium of piston 54, stem 64, lever 65 and rod 68 to move the valve 70 away from the seat rib 71 and thereby establish communication between chambers 38 and 36. With the vent valve 35 and valve 70 unseated fluid under pressure is quickly vented from the brake pipe 4 to the atmosphere through pipe 11, passages 10, 9, 40, 39, chamber 38, past unseated valve 70, passage 37, chamber 36, past unseated brake pipe vent valve 35, chamber 46 and atmospheric passage 47.

With the several parts of the emergency portion in emergency position a cavity 82 in the main slide valve connects an emergency reservoir passage 83 to a passage 84 which leading to a brake cylinder pipe 85, so that fluid under pressure is permitted to flow from emergency reservoir 5 to brake cylinder 6 to apply the brakes with a high emergency brake cylinder pressure.

When the vent valve 35 is unseated by piston 41 said piston will be in sealing engagement with a gasket 88, and will therefore prevent leakage of fluid under pressure past the periphery of said piston from chamber 44 to chamber 46. As a result, the fluid under pressure supplied to chamber 44 is permitted to gradually reduce by flow through timing port 50 to chamber 46 and from thence to the atmosphere through passage 47.

The size of the timing port 50 is so related to the volumes of the valve chamber 12 and quick action chamber 13 that the supply of fluid from said chambers will act to hold the vent valve piston 41 in the position in which the vent valve 35 is unseated for a period of time sufficient to ensure substantially complete venting of fluid under pressure from brake pipe 4.

When the pressure of fluid in chamber 44 becomes sufficiently reduced to be overcome by the force of the spring 43, the spring acts to seat the vent valve 35 and return the piston 35 to its normal position, so that, when desired, the pressure in brake pipe 4 may be increased for effecting a release of the brakes and for recharging the brake equipment.

When it is desired to effect a release of the brakes, fluid under pressure is supplied to brake pipe 4 and from thence flows to piston chamber 8 causing the several parts of the emergency portion and vent valve device to move to their release positions. When, in releasing the brakes, the brake pipe pressure in chamber 55 becomes high enough for the piston 54 to overcome the opposing force of the spring 62 the piston will move to its seated position, the piston in its traverse operating the lever 65 to seat the valve 70 so as to close communication from the chamber 38 to vent valve chamber 36.

There is a possibility that after the emergency valve device 2 has been in use the static and perhaps the kinetic resistance to movement of the emergency piston 7 and auxiliary slide valve 16 may become greater than normal due, for instance, to foreign matter, lack of lubrication, the use of improper lubricant or for other reasons.

In case the resistance to movement of these parts should increase above normal the emergency valve device may require a pressure differential greater than .4 of a pound to start the parts moving. However, in case the kinetic resistance to movement of the parts should remain relatively low while the static resistance to movement should increase to a relatively high value, there is then a possibility that after the parts start moving from their normal position a high pressure differential on the piston would cause the piston and associated parts to move so fast that the auxiliary slide valve 16 would move through the service position to the emergency position since there would be an insufficient time of registration between port 75 and 76 to make a reduction in pressure in valve chamber 12 sufficient to coact with spring 28 to destroy the pressure differential on the piston. If the auxiliary slide valve should thus be moved to emergency position upon a service reduction in brake pipe pressure the quick action vent valve device will be caused to operate to vent fluid under pressure from the brake pipe and thereby cause the main slide valve to be moved to emergency position and effect an emergency application of the brakes.

According to the invention, however, this undesired operation of the vent valve device will not effect a reduction in brake pipe pressure for the reason that the valve 70 under the influence of piston 54 maintains communication between chambers 38 and 36 closed.

In the event of such undesired movement of the main slide valve 15 to emergency position cavity 82 therein will connect passages 83 and 84 and thus permit flow of fluid under pressure from the emergency reservoir to the brake cylinder and thus produce a high pressure in the brake cylinder. While this is not desired when effecting a service application of the brakes it is not particularly objectionable so far as controlling a train is concerned since it is not likely that more than one valve in the whole train will ever operate in this manner. The important result obtained, however, is that this undesired operation of the vent valve device will not result in the venting of fluid from the brake pipe and thereby the propagation of an emergency application of brakes on any of the other cars of the train.

It will be evident that in case of undesired movement of the main slide valve as above described, the service vent port 76 in the main slide valve is moved out of registry with the atmospheric passage 77, so that the pressure in chambers 12 and 13 cannot reduce in the manner hereinbefore described in connection with effecting a service application of the brakes. However, when the pressure in the emergency reservoir is reduced sufficiently by flow to the brake cylinder, the pressure of fluid in chambers 12 and 13 will unseat the check valves 100 and 101 and thus be equalized through passages 103 and 83 with that in the emergency reservoir. A sufficient reduction in pressure will thus be obtained in chamber 12 to insure movement of the emergency valve parts back to their normal position upon an increase in brake pipe pressure in chamber 8 over the reduced pressure in chamber 12.

It will now be noted that according to the invention the emergency portion is provided with means which, in case either or both of the emergency slide valves are unintentionally moved beyond their normal service position in effecting a service application of the brakes, will prevent local quick action or venting of fluid under pressure from the brake pipe while the vent valve 35 remains unseated and thus prevent the propagation of an emergency application of the brakes throughout the length of the train.

While one illustrative embodiment of the invention has been described in detail, it is not my intention to limit its scope to this embodiment or otherwise than by the terms of the appended claims.

Having now described my invention, what I claim as new and desire to secure by Letters Patent, is:

1. In a fluid pressure brake equipment of the type adapted to effect either a service or an emergency application of the brakes and comprising a brake pipe normally charged with fluid under pressure and quick action valve means operative upon an emergency reduction in brake pipe pressure to effect a quick action reduction in brake pipe pressure, in combination, a passage through which the quick action venting of fluid from the brake pipe is accomplished, a valve normally closing said passage, and pressure responsive means controlled by brake pipe pressure and movable only upon a chosen amount of reduction in brake pipe pressure regardless of the rate of brake pipe reduction to open said valve.

2. In a fluid pressure brake equipment of the type adapted to effect either a service or an emergency application of the brakes and comprising a brake pipe normally charged with fluid under pressure and quick action valve means operative upon an emergency reduction in brake pipe pressure to effect a quick action reduction in brake pipe pressure, in combination, a passage through which the quick action venting of fluid from the brake pipe is accomplished, a valve normally closing said passage, and pressure responsive means for maintaining said valve in its passage closing position until the reduction in brake pipe exceeds a chosen amount regardless of the rate of brake pipe reduction.

3. In a fluid pressure brake equipment of the type adapted to effect either a service or an emergency application of the brakes and comprising a brake pipe normally charged with fluid under pressure and quick action valve means operative upon an emergency reduction in brake pipe pressure to effect a quick action reduction in brake pipe pressure, in combination, a passage through which the quick action venting of fluid from the brake pipe is accomplished, a valve normally closing said passage, a spring, and means controlled by the opposing pressures of said brake pipe and said spring and operative only upon a certain predetermined amount of reduction in brake pipe pressure and regardless of the rate of such reduction for operating said valve to open said passage.

4. In a fluid pressure brake equipment of the type having a brake pipe normally charged with fluid under pressure, valve means responsive to variations in brake pipe pressure for controlling the application and release of the brakes, and quick action means operative upon movement of said valve means to emergency position to effect a quick action reduction in brake pipe pressure, in combination, a brake pipe communication leading to said quick action means, a valve operative to control the opening and closing of said communication, and a movable abutment responsive only to a chosen amount of reduction in brake pipe pressure and regardless of the rate of such reduction for actuating said valve, said abutment normally maintaining said valve in its communication closing position so long as the brake pipe pressure is not reduced in excess of said chosen amount.

5. In a fluid pressure brake equipment of the type having a brake pipe normally charged with fluid under pressure and valve means operative upon a service reduction in brake pipe pressure for effecting a service application of the brakes and operative upon an emergency reduction in brake pipe pressure for effecting an emergency application of the brakes and for effecting quick action venting of fluid from the brake pipe, in combination, a passage through which the quick action venting is accomplished, a valve normally closing said passage, and a movable abutment non-responsive to the rate of reduction in brake pipe pressure and operative only upon a chosen amount of reduction in brake pipe pressure for actuating said valve to open said passage.

6. In a fluid pressure brake equipment of the type having a brake pipe normally charged with fluid under pressure and valve means operative upon a service reduction in brake pipe pressure for effecting a service application of the brakes and operative upon an emergency reduction in brake pipe pressure for effecting an emergency application of the brakes and for effecting quick action venting of fluid from the brake pipe, in combination, a passage through which the quick action venting is accomplished, a valve normally closing said passage, and an abutment subject to brake pipe pressure for maintaining said valve in its passage closing position and operative to actuate said valve to open said communication only upon a chosen amount of brake pipe reduction and regardless of the rate of such reduction.

7. In a fluid pressure brake equipment of the type having a brake pipe normally charged with fluid under pressure, valve means operative upon a service reduction in brake pipe pressure to effect a service application of the brakes and operative upon an emergency reduction in brake pipe pressure for effecting an emergency application of the brakes, in combination, a quick action vent valve device controlled by said valve means for effecting quick action venting of fluid from the brake pipe, a fluid conducting communication leading from the brake pipe to said vent valve device, a valve controlling the opening and closing of said communication, and an abutment subject to brake pipe pressure for normally maintaining said valve in its communication closing position and responsive only to a predetermined reduction in brake pipe pressure in excess of a chosen amount and regardless of the rate of such reduction for actuating said valve to open said communication.

8. In a fluid pressure brake, in combination, a brake pipe normally charged with fluid under pressure, a quick action chamber, a quick action brake pipe vent valve device operative to effect a sudden venting of fluid under pressure from the brake pipe, valve means for effecting an emergency application of the brakes and for also supplying fluid under pressure to said vent valve device to effect operation thereof, a piston subject to the opposing pressures of said brake pipe and chamber and operative upon a predetermined differential of pressures for effecting operation of said valve means, a valve arranged to normally cut-off the flow of fluid from the brake pipe to the vent valve device, and pressure responsive means movable only upon a chosen amount of reduction in brake pipe pressure and regardless of the rate of such reduction for actuating said valve to permit the flow of fluid from the brake pipe to the vent valve device.

9. In a fluid pressure brake, in combination, a brake pipe normally charged with fluid under pressure, a quick action chamber, a quick action brake pipe vent valve device operative to effect a sudden venting of fluid under pressure from the brake pipe, valve means for effecting an emergency application of the brakes and for also supplying fluid under pressure to said vent valve device to effect operation thereof, a piston subject to the opposing pressures of said brake pipe and chamber and operative upon a predetermined differential of pressures for effecting operation of said valve means, a fluid conducting communication leading from the brake pipe to said vent valve device, a valve controlling the opening and closing of said communication, and an abutment subject to brake pipe pressure for normally maintaining said valve in its communication closing position and responsive to a predetermined reduction in brake pipe pressure of a chosen amount and regardless of the rate of such reduction for actuating said valve to its communication opening position.

JOSEPH C. McCUNE.